Figure 1:
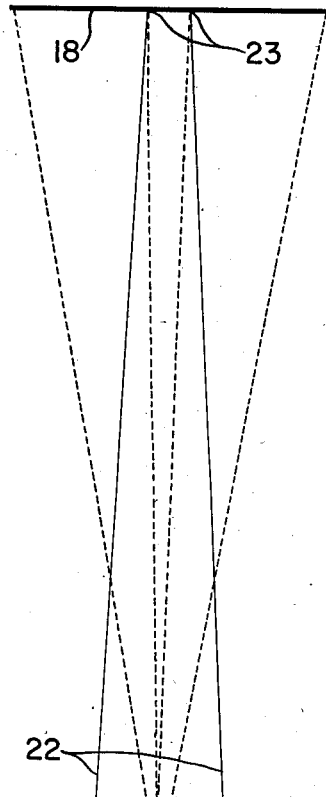
Figure 1:
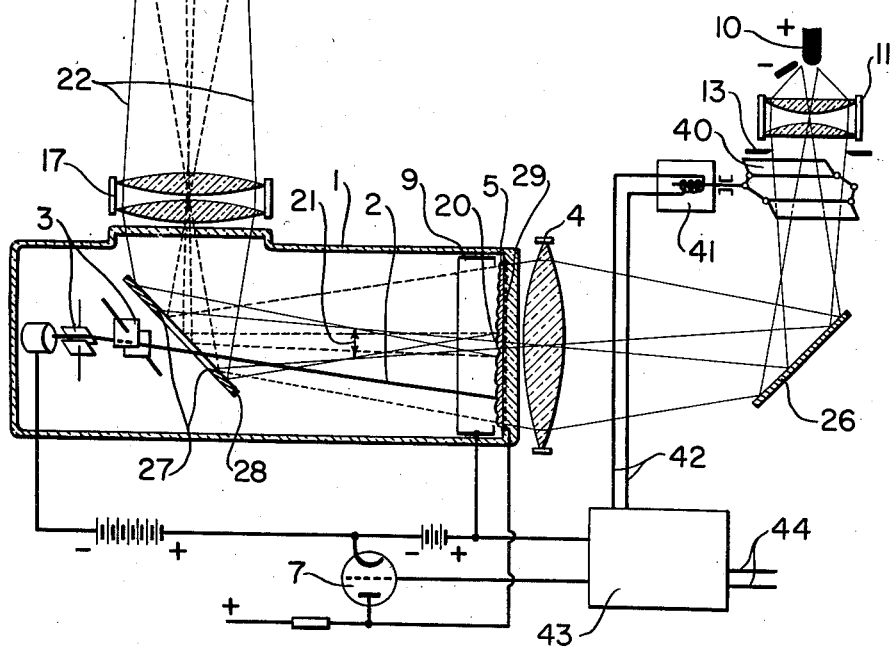

June 17, 1952

E. F. FISCHER 2,600,397

AUTOMATIC REGULATION OF LIGHT FALLING ON
DEFORMABLE CATHODE-RAY TUBE SCREEN

Filed Dec. 29, 1947

2 SHEETS—SHEET 1

INVENTOR.
Ernst Friedrich Fischer
BY
ATTORNEY

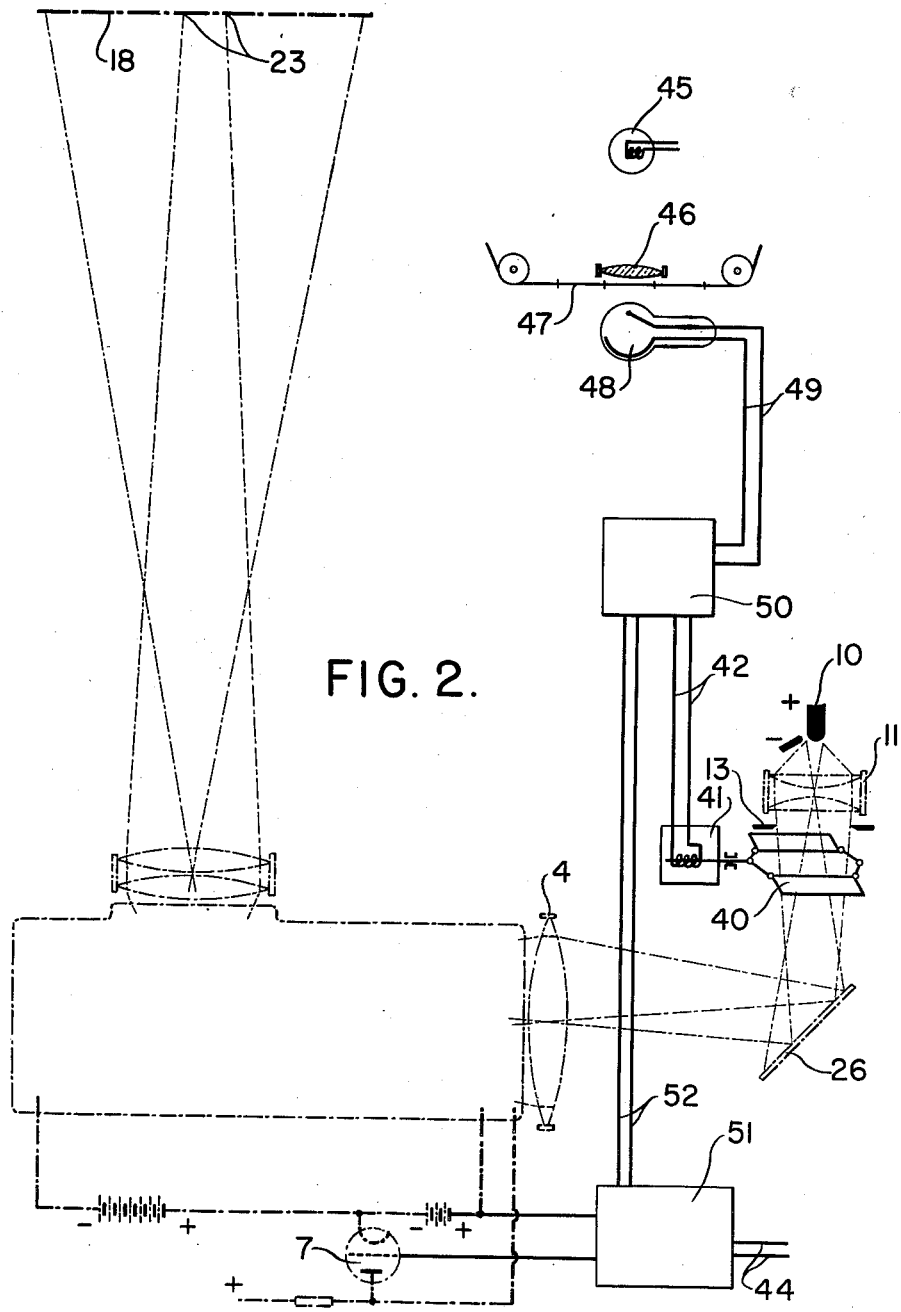

Patented June 17, 1952

2,600,397

UNITED STATES PATENT OFFICE 2,600,397

AUTOMATIC REGULATION OF LIGHT FALLING ON DEFORMABLE CATHODE-RAY TUBE SCREEN

Ernst Friedrich Fischer, Zurich, Switzerland

Application December 29, 1947, Serial No. 794,226
In Switzerland December 9, 1939

Section 1, Public Law 690, August 8, 1946
Patent expires December 9, 1959

2 Claims. (Cl. 178—7.5)

This invention relates to an improvement in, or modification of, the invention described and claimed in my patent No. 2,391,450, dated December 25, 1945.

With the method of, and apparatus for, reproducing a television picture with a cathode ray tube and separate light source as described in the said patent, the light of this light source is so controlled by an optical layer which is deformable by the cathode ray, that when a picture is present it is projected by different lens systems on to the projection screen, whereas, otherwise, when the layer is not deformed, it is projected on to a shutter or diaphragm which prevents the entire light from reaching the projection screen. Thus, when the layer is not deformed, the projection screen remains absolutely dark, whereas when the layer is deformed, the light reaches the projection screen by passing by the diaphragm.

However, it is known in the art that the usual lens systems do not function in an ideal manner, but produce scattered light to a greater or less degree. Consequently even with the subject matter of the invention of the patent, in which even several lens systems are employed, it is not possible to eliminate scattered light which, even when the diaphragm is not deformed, reaches the projection screen past the diaphragm and imparts to the latter a certain basic brightness, which cannot be reduced.

Since, as is known, the scattered light bears a definite relationship to the stream of light supplied by the light source, the basic brightness produced by the scattered light is directly proportional to the stream of light or brightness of the light source. As is also known, this basic brightness, which prevents the black parts of the picture from appearing as completely black parts on the projection screen, has a detrimental effect on the wealth of contrast of a picture only when the ratio of the brightness of the brightest parts of the picture to the brightness of the darkest parts falls below a definite amount. According to tests, this ratio should amount to at least 100 in order to obtain a picture with satisfactory graduations of brightness. The quality of a picture is thus not dependent upon the basic brightness in itself, but upon the said ratio, which is referred to as the range of brightness of the picture.

Now, with the device according to the aforesaid patent, the disadvantage exists that in the projection of pictures with poor lights, i. e. of pictures having a small average brightness, the constant basic brightness always appears in a disturbing manner.

If, for example, the range of brightness of the picture amounts to just 100 with the medium deformed to its maximum extent, which is obtainable with the lens system which is customary at the present time, and thus a good quality picture is formed, then with a picture having an average brightness which only amounts to a tenth of this, the range of brightness drops to the inadmissible small amount 10, in consequence of the basic brightness remaining constant.

The object of the present invention, therefore, is to provide a method of, and apparatus for, eliminating these disadvantages.

According to the invention, the light stream of the separate light source is controlled in accordance with the average picture brightness of the individual pictures, whereby a compensation is simultaneously and automatically obtained by increased intensification of the picture.

The apparatus for carrying this method into effect includes a device for determining the average brightness value of the picture and a device for proportionately varying the light stream and the intensification.

In this way, with pictures having a low average brightness, the scattered light and thus the basic brightness is reduced by restricting the light stream, whereas, on the other hand, due to the simultaneous increase in the intensification of the picture, the latter appears on the projection screen with the correct brightness values despite the reduced light stream. This is to be explained by the fact that the increased intensification of the picture signal results in an increased deformation of the medium, whereby in return more light reaches the projection screen.

As will be readily understood, the brightness of a picture point on the projection screen is dependent upon the product of light stream multiplied by deformation of the layer at the corresponding place, or the product of light stream multiplied by intensification. As the individual factors of the product are correspondingly varied, the brightness of the picture point can nevertheless be kept constant, whereas, on the other hand, the scattered light declines corresponding to the reduction of the light stream.

The determination of the average picture brightness can take place in known manner by optical or electrical means, for example, by a photo-cell or by determining the average picture signal potential.

In film scanners, the photo-cell can be arranged directly at the film frame just to be scanned or even some frames in front. By means of the latter arrangement, the result is obtained that the average brightness is already registered a definite time in advance, so that no delay can occur in the control of the light source and of the intensification.

Furthermore, there is no difficulty in influencing an intensifier and a restricting device for the light stream with this value found in such a manner. The influencing can be effected by hand or automatically. It is simplest to use the control amplifier or intensifier already described in the above-named patent as the intensifier. Obviously, the cathode ray tube itself can be influenced in such a manner that the average ray current has a definite ratio to the average picture brightness.

Various devices and methods can be employed for restricting the light stream or current. For example, the current strength of the light source and thus its brightness can be varied or, with a fixed brightness of the light source, the light current can be varied by inserting diaphragms in the path of light or filters of stronger or weaker absorptive power.

Further, control devices can be provided in the light current which contain means for polarisation, production of double refraction and for analysis. As is known, light currents can be varied with the aid of such devices, by for example, the polariser and analyser being rotated relatively to one another or with respect to the double-refracting means, or by the magnitude of the double refraction being influenced, which, with many substances, can be obtained with the aid of an electric potential.

Finally, it is also possible to provide, in the light current, variable diffracting or refracting means for controlling the light current.

In the accompanying drawing, there is diagrammatically shown in Figs. 1 and 2, by way of example, an arrangement for the control of the light stream with, at the same time, corresponding amplification of the television signal.

The drawing is based on Fig. 4 of my above-mentioned patent. For a better understanding of the invention the reference numerals of the said Fig. 4 of the patent have been retained.

A diaphragm 40, which is adjustable by an electromagnet 41, is arranged in the light stream being emitted by the light source 10. 43 is an electrical amplifier which, with known means, forms the average value of the television signal arriving through the leads 44. In accordance with this average value, the magnet 41 and thus the diaphragm 40 are, on the one hand, influenced through the leads 42 whereas, on the other hand, in accordance with this average value, a larger or smaller television signal is supplied to the final amplifier 7. Corresponding to the basic idea of the invention, when the electrical picture signal has a large average value, a small signal potential must be supplied to the final amplifier and the light stream must be correspondingly increased, and vice versa.

Fig. 2 represents diagrammatically how the average brightness value of a picture is ascertained directly at the film scanner. The film 47 is illuminated by a light source 45 through a lens 46, and a photocell 48 is arranged behind the film 47. The photocell current corresponding to the average picture brightness reaches a known control amplifier 50 through the leads 49, the amplifier again influencing the magnet 41 and thus the diaphragm 40 through leads 42. Furthermore, through leads 52, the television amplifier 51 to which the television signal is conveyed through leads 44 is influenced in such a manner that the final amplifier 7 receives a larger or smaller television signal. The manner of operation of this embodiment is otherwise the same as that according to Fig. 1.

For the sake of simplicity, the parts not essential for the device for varying the light stream according to the television signal are only represented in dotted lines.

Having now particularly described and ascertained the nature of my said invention, and in what mannner the same is to be performed, I declare that what I claim is:

1. A television receiver comprising a cathode ray tube, a separate source of light, a deformable optical layer arranged to be swept by the cathode ray, an optical system for projecting the light beam from said source of light onto a screen by way of said deformable layer, the cathode ray acting to deform the optical layer and thereby to modulate the light beam pursuant to a received television signal, a diaphragm arranged to block the passage of light to the screen when the television signal is zero, and mechanism for eliminating the contrast-reducing effects of stray light projected from the optical layer onto the screen past the diaphragm even when the television signal is zero, and comprising means for determining the average picture brightness of the individual pictures, a device responsive to said brightness-determining means for controlling the light stream for reducing the intensity of such stream when the average brightness falls, and mechanism likewise responsive to said brightness-determining means for simultaneously increasing the amplitude of the picture signal received by the cathode ray tube.

2. Apparatus as defined in claim 1, wherein the device for controlling the intensity of the light stream comprises a movable diaphragm arranged in the path of said light stream.

ERNST FRIEDRICH FISCHER.

REFERENCES CITED

The following references are of record in the file of this patent:

UNITED STATES PATENTS

| Number | Name | Date |
|---|---|---|
| 2,124,478 | Tolson | July 19, 1938 |
| 2,133,882 | Zworykin | Oct. 18, 1938 |
| 2,186,542 | Gloess | Jan. 9, 1940 |
| 2,264,172 | Batchelor | Nov. 25, 1941 |
| 2,296,050 | Poch | Sept. 15, 1942 |
| 2,310,671 | Batchelor | Feg. 9, 1943 |
| 2,421,476 | Belar et al. | June 3, 1947 |

FOREIGN PATENTS

| Number | Country | Date |
|---|---|---|
| 404,020 | Great Britain | Jan. 8, 1934 |
| 524,672 | Great Britain | Aug. 12, 1940 |